United States Patent
Mitasaki et al.

(10) Patent No.: US 10,375,402 B2
(45) Date of Patent: Aug. 6, 2019

(54) IMAGE ENCODING APPARATUS AND METHOD, AND IMAGE ENCODING PROGRAM

(71) Applicant: NIPPON TELEGRAPH AND TELEPHONE CORPORATION, Tokyo (JP)

(72) Inventors: Tokinobu Mitasaki, Yokosuka (JP); Naoki Ono, Yokosuka (JP); Atsushi Shimizu, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 100 days.

(21) Appl. No.: 14/903,132

(22) PCT Filed: Jul. 22, 2014

(86) PCT No.: PCT/JP2014/069292
§ 371 (c)(1),
(2) Date: Jan. 6, 2016

(87) PCT Pub. No.: WO2015/012253
PCT Pub. Date: Jan. 29, 2015

(65) Prior Publication Data
US 2016/0156911 A1 Jun. 2, 2016

(30) Foreign Application Priority Data
Jul. 25, 2013 (JP) ................... 2013-155035

(51) Int. Cl.
*H04N 19/176* (2014.01)
*H04N 19/122* (2014.01)
(Continued)

(52) U.S. Cl.
CPC ......... *H04N 19/176* (2014.11); *H04N 19/119* (2014.11); *H04N 19/122* (2014.11);
(Continued)

(58) Field of Classification Search
CPC .................................... H04N 19/176
(Continued)

(56) References Cited

U.S. PATENT DOCUMENTS 5,455,680 A 10/1995 Shin
2003/0035477 A1* 2/2003 Sekiguchi ............ H04N 19/176
375/240.08
(Continued)

FOREIGN PATENT DOCUMENTS

EP 0725363 A2 8/1996
EP 1370087 A1 12/2003
(Continued)

OTHER PUBLICATIONS

Wien M: "Variable block-size transforms for H.264/AVC", IEEE Transactions on Circuits and Systems for Video Technology, IEEE Service Center, Piscataway, NJ, US, vol. 13, No. 7, Jul. 1, 2003, pp. 604-613.
(Continued)

*Primary Examiner* — Dave Czekaj
*Assistant Examiner* — Shanika M Brumfield
(74) *Attorney, Agent, or Firm* — Harness, Dickey & Pierce, P.L.C.

(57) ABSTRACT

An image encoding method that encodes an image so as to optimize estimated values of processing units which are a coding unit, a prediction unit, and a transform unit by selecting sizes of the individual processing units. The method includes a division step that divides an image having a size of the coding unit into a plurality of blocks; an activity computation step that computes activities pertaining to the
(Continued)

individual blocks; and a transform unit size determination step that determines, based on the computed activities, a size pattern of the transform unit within the image having the size of the coding unit.

6 Claims, 12 Drawing Sheets

(51) Int. Cl.
*H04N 19/139* (2014.01)
*H04N 19/119* (2014.01)
*H04N 19/52* (2014.01)
*H04N 19/61* (2014.01)
*H04N 19/14* (2014.01)
*H04N 19/147* (2014.01)

(52) U.S. Cl.
CPC ........... *H04N 19/139* (2014.11); *H04N 19/14* (2014.11); *H04N 19/52* (2014.11); *H04N 19/61* (2014.11); *H04N 19/147* (2014.11)

(58) Field of Classification Search
USPC .......................................... 375/240.02–240.2
See application file for complete search history.

(56) References Cited

U.S. PATENT DOCUMENTS

| | | | |
|---|---|---|---|
| 2007/0206679 A1* | 9/2007 | Lim | ....................... H04N 19/00 375/240.18 |
| 2011/0142134 A1 | 6/2011 | Wahadaniah et al. | |
| 2013/0016788 A1* | 1/2013 | Oh | ....................... H04N 19/107 375/240.16 |

FOREIGN PATENT DOCUMENTS

| | | | |
|---|---|---|---|
| EP | 2557792 A1 | 2/2013 | |
| JP | 06-326875 A | 11/1994 | |
| JP | 08-205140 A | 8/1996 | |
| JP | 11-164305 A | 6/1999 | |
| JP | 2003-523652 A | 8/2003 | |
| JP | 2009-055236 A | 3/2009 | |
| JP | WO 2010150486 A1 * | 12/2010 | ........... H04N 19/176 |
| WO | WO-01/35673 A1 | 5/2001 | |
| WO | WO-2010/150486 A1 | 12/2010 | |

OTHER PUBLICATIONS

Extended European Search Report for parallel application EP 14829306.1, ISA/EP, dated Feb. 1, 2017.
Benjamin Bross et al., "High efficiency video coding (HEVC) text specification draft 10 (for FDIS & Consent)", JCTVC-L1003_v20.doc, Joint Collaborative Team on Video Coding (JCT-VC) of ITU-T SG16 WP3 and ISO/IEC JTC1/SC29/WG11, pp. 148-163, Jan. 2013.
International Search Report for PCT/JP2014/069292, ISA/JP, dated Oct. 21, 2014, with English translation thereof.

* cited by examiner

IMAGE ENCODING APPARATUS AND METHOD, AND IMAGE ENCODING PROGRAM

CROSS-REFERENCE TO RELATED APPLICATIONS

This application is a 371 U.S. National Stage of International Application No. PCT/JP2014/069292, filed Jul. 22, 2014, which claims the benefit of and priority to Japanese Patent Application No. 2013-155035, filed Jul. 25, 2013. The entire disclosures of the above applications are incorporated herein by reference.

TECHNICAL FIELD

The present invention relates to an image encoding apparatus, an image encoding method, and an image encoding program.

BACKGROUND ART

Recently, the spread of broadband services makes viewing of video contents through a network easier, and it is anticipated that more than half of the data on a network will be video data in near future. In such circumstances, video encoding is employed so as to effectively utilize the network bandwidth. At present, a video encoding system such as MPEG2 or H.264/AVC is utilized.

In order to further improve the encoding efficiency, standardization of HEVC has been promoted. The HEVC employs units such as CU (Coding Unit), PU (Prediction Unit), and TU (Transform Unit) for individual processes, and the size and mode of each unit is determined so as to obtain an optimum RD (Rate Distortion) cost, which can improve the encoding efficiency twice as much as that obtained by H.264 (see, for example, Non-Patent Document 1).

PRIOR ART DOCUMENT

Non-Patent Document

Non-Patent Document 1: Benjamin Bross, Woo-Jin Han, Jens-Rainer Ohm, Gary J. Sullivan, Ye-Kui, Wang, Thomas Wiegand, "High efficiency video coding (HEVC) text specification draft 10 (for FDIS & Consent)", JCTVC-L1003_v20.doc, Joint Collaborative Team on Video Coding (JCT-VC) of ITU-T 5G16 WP3 and ISO/IEC JTC1/SC29/WG11, pp. 148-163, January 2013.

DISCLOSURE OF INVENTION

Problem to be Solved by the Invention

However, when performing such optimization, it is necessary to perform orthogonal transformation for all TU sizes (sizes of TU) as candidates and to select an optimum TU size among them, which increases the load of the encoding processing.

In light of the above circumstances, an object of the present invention is to provide an image encoding apparatus, an image encoding method, and an image encoding program, which can appropriately determine the TU size while suppressing the increase in the load of the encoding processing.

Means for Solving the Problem

The present invention provides, as a first mode of the invention, an image encoding apparatus that encodes an image so as to optimize estimated values of processing units which are a coding unit, a prediction unit, and a transform unit by selecting sizes of the individual processing units, the apparatus comprising:
  a division device that divides an image having a size of the coding unit into a plurality of blocks;
  an activity computation device that computes activities pertaining to the individual blocks; and
  a transform unit size determination device that determines, based on the computed activities, a size pattern of the transform unit within the image having the size of the coding unit.

In a typical example, the image encoding apparatus further comprises:
  a subdivision device that further divides each of the blocks into a plurality of small blocks,
  wherein the activity computation device computes individual activities of the small blocks; and
  if the activities of all the small blocks are each smaller than or equal to a predetermined threshold, the transform unit size determination device determines the size of the transform unit in the relevant block to be a block size of the relevant block, otherwise the transform unit size determination device determines the size pattern of the transform unit by repeatedly subjecting each of the small blocks to the subdivision and the comparison with the threshold a predetermined number of times.

In another typical example, the activity computation device that computes individual activities of the blocks; and
  the transform unit size determination device sets the size of the transform unit within the coding unit to any one of a plurality of sizes by comparing the activities of all the blocks with a predetermined threshold for one or more thresholds.

In another typical example, the activity computation device that computes individual activities of the blocks; and
  the size of the transform unit within the coding unit is set to any one of a plurality of sizes by comparing a difference in the activity between any adjacent blocks among the plurality of the blocks with a predetermined threshold for one or more thresholds.

The present invention provides, as a second mode of the invention, an image encoding apparatus that encodes an image so as to optimize estimated values of processing units which are a coding unit, a prediction unit, and a transform unit by selecting sizes of the individual processing units, the apparatus comprising:
  a division device that divides an image having a size of the coding unit into a plurality of blocks;
  a motion information computation device that computes motion information which indicates a motion state of each of the blocks by utilizing a numeric value:
  a transform unit size determination device that determines, based on the computed motion information, a size pattern of the transform unit within the image having the size of the coding unit.

In a typical example, the image encoding apparatus further comprises:
  a subdivision device that further divides each of the blocks into a plurality of small blocks,
  wherein the motion information computation device computes individual motion information items of the small blocks; and if the motion information items of all the small blocks are each smaller than or equal to a predetermined threshold, the transform unit size determination device determines the size of the transform unit in the relevant block to be a block size of the relevant block, otherwise the transform unit size determination device determines the size pattern of the transform unit by repeatedly subjecting each of the small blocks to the subdivision and the comparison with the threshold a predetermined number of times.

In another typical example, the motion information is a motion vector, and the image encoding apparatus further comprises:
 a motion vector acquisition device that acquires, for each of the blocks, motion vectors of any two blocks adjacent to the relevant block, where the two blocks each have a size smaller than or equal to the size of the relevant block; and
 if a difference between the two motion vectors is smaller than or equal to a predetermined threshold, the transform unit size determination device determines the size of the transform unit in the relevant block to be a block size of the relevant block, otherwise the relevant block is further divided into small blocks, and the transform unit size determination device determines the size pattern of the transform unit by repeatedly subjecting, a predetermined number of times, each of the small blocks to the motion vector acquisition of the adjacent blocks and the comparison between the difference of the motion vectors and the threshold.

In a preferable example, if an encoding target is an I picture or is to be encoded by intra prediction, image encoding of the encoding target is performed by using the image encoding apparatus in the first mode, otherwise the image encoding is performed by using the image encoding apparatus in the second mode.

The present invention also provides an image encoding method that encodes an image so as to optimize estimated values of processing units which are a coding unit, a prediction unit, and a transform unit by selecting sizes of the individual processing units, the method comprising:
 a division step that divides an image having a size of the coding unit into a plurality of blocks;
 an activity computation step that computes activities pertaining to the individual blocks; and
 a transform unit size determination step that determines, based on the computed activities, a size pattern of the transform unit within the image having the size of the coding unit.

The present invention also provides an image encoding method that encodes an image so as to optimize estimated values of processing units which are a coding unit, a prediction unit, and a transform unit by selecting sizes of the individual processing units, the method comprising:
 a division step that divides an image having a size of the coding unit into a plurality of blocks;
 a motion information computation step that computes motion information which indicates a motion state of each of the blocks by utilizing a numeric value;
 a transform unit size determination step that determines, based on the computed motion information, a size pattern of the transform unit within the image having the size of the coding unit.

The present invention also provides an image encoding program by which a computer executes any one of the above image encoding methods.

Effect of the Invention

In accordance with the present invention, it is possible to appropriately determine the TU size while suppressing the increase in the load of the encoding processing.

MODE FOR CARRYING OUT THE INVENTION

Below, an image encoding apparatus as an embodiment of the present invention will be explained with reference to the drawings.

The present invention does not employ the method in which the orthogonal transformation is applied to all TU sizes and a TU size having the optimum RD cost is selected. Instead, an optimum TU size is determined based on a prediction mode (PU division state) within a CU as a unit for the TU size optimization, and an activity or motion state of the CU.

Accordingly, a faster TU size determination process is implemented while suppressing a decrease in the encoding efficiency.

Figure 1:
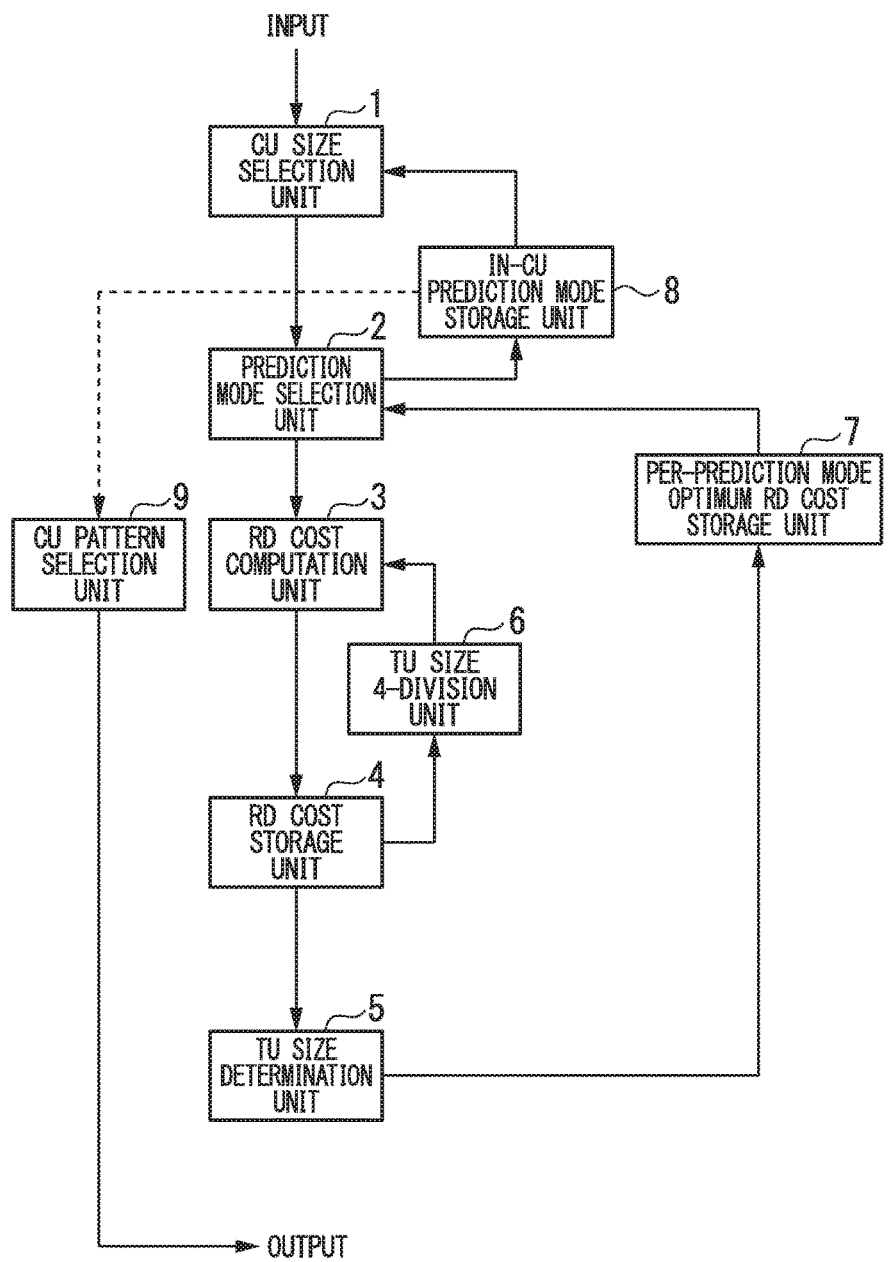
FIG. 1 is a block diagram showing the configuration of a CU size determination apparatus in which a reference software (HM) provided by an HEVC standardization group is installed.

FIG. 1 is a block diagram showing the configuration of a CU size determination apparatus in which a reference software (HM: High Efficiency Video Coding Test Model) provided by an HEVC standardization group is installed.

First, a CU size selection unit 1 selects a CU having a size of, for example, 64×64 (pixels), as an LCU (Largest Coding Unit).

A prediction mode selection unit 2 selects from a plurality of prediction modes, for example, "prediction mode 1", so as to perform a prediction process. An RD cost computation unit 3 computes the RD cost for the largest TU size among selectable TU sizes and stores the obtained result (called the "RD cost") in an RD cost storage unit 4.

Then, a TU size 4-division unit 6, divides the maximum TU size into four areas, and the RD cost is computed for each area, where the obtained result is also stored in the RD cost storage unit 4.

A similar process is repeatedly executed until the smallest selectable TU size is obtained (i.e., 4-division→16-division→64-division . . . ). In a TU size determination unit 5, a TU size having an optimum RD cost is determined to be an optimum TU size in the prediction mode 1.

On the other hand, a per-prediction mode optimum RD cost storage unit 7 stores an optimum RD cost in the prediction mode 1.

A similar process as described above is performed for each of all prediction modes (i.e., prediction mode 2, prediction mode 3, . . . ) so as to determine an optimum prediction mode for the CU having the size of 64×64 pixels (an optimum TU size in the relevant prediction mode is also determined). In an in-CU prediction mode storage unit 8, the optimum prediction mode is stored.

Next, the CU size selection unit 1 executes a similar optimum TU size and prediction mode determination operation for CU sizes from 32×32 pixels to a smallest selectable size.

After all CU sizes are processed, a CU pattern selection unit 9 selects a CU pattern having an optimum RD cost in the LCU. Accordingly, the processing within the relevant LCU is completed.

Figure 2:
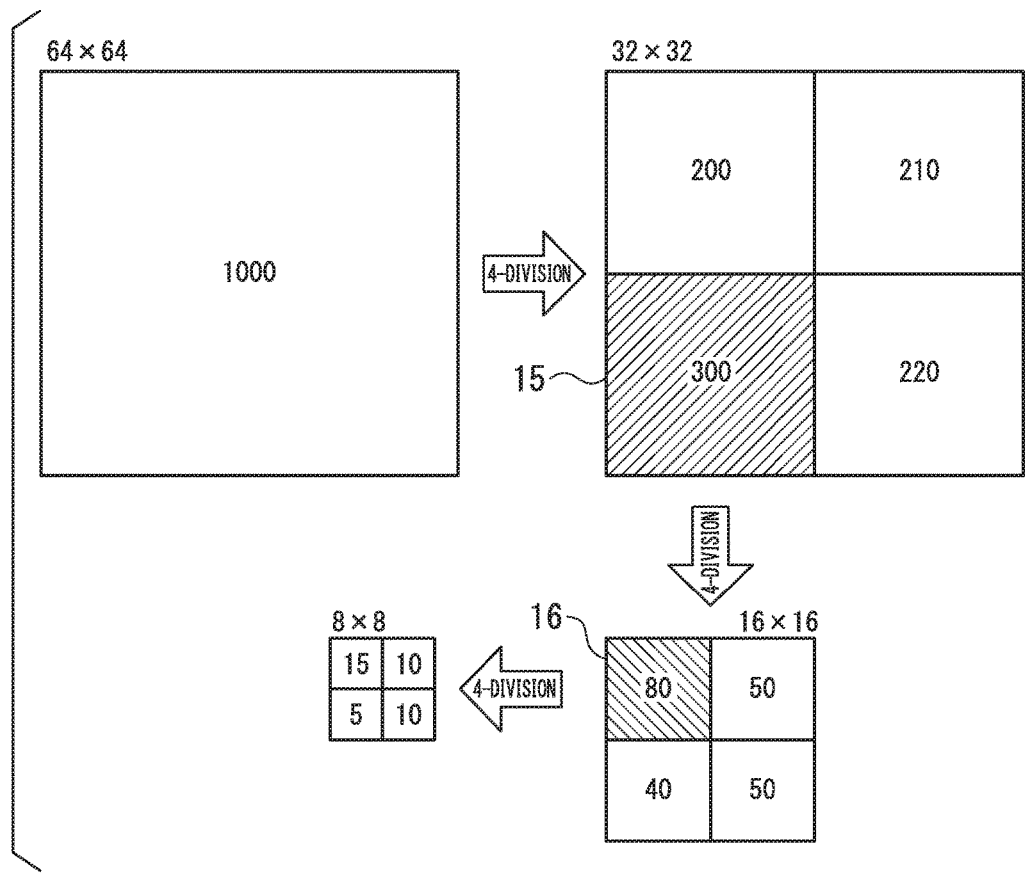
FIG. 2 is a schematic diagram utilized to explain a method of extracting an optimum CU division.
Figure 3:
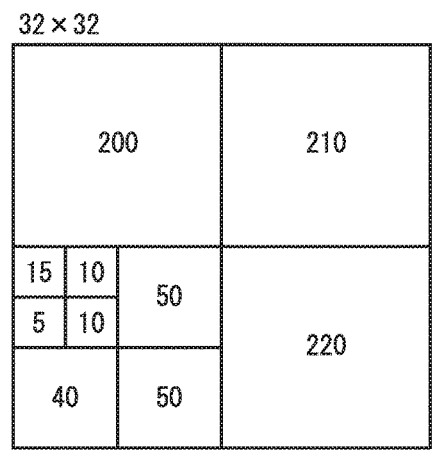
FIG. 3 is a schematic diagram showing an example of the optimum CU division obtained by the optimum CU division extracting method.

FIG. 2 is a schematic diagram utilized to explain a method of extracting an optimum CU division. FIG. 3 is a schematic diagram showing an example of the optimum CU division obtained by the optimum CU division extracting method.

First, the RD cost is computed from the CU size of 64×64 (pixels) as shown in FIG. 2. In the example of FIG. 2, the RD cost is 1000.

Next, the current size is divided into a size of 32×32 pixels (i.e., ¼ of its original size), that is, divided in half vertically and horizontally, and the amount of code generated for each divided area is computed. In the example shown in FIG. 2, the individual amounts of code are 200, 210, 220, and 300.

Then, the CU "15" which generates the maximum amount of code may be further divided into a size of 16×16 pixels (i.e., 1/16 of its original size), that is, divided in half vertically and horizontally, and the amount of code generated for each divided area is computed. In this case, the individual amounts of code are 80, 50, 50, and 40.

Finally, the CU "16" which generates the maximum amount of code may be further divided into a size of 8×8 pixels (i.e., 1/64 of its original size), that is, divided in half vertically and horizontally, and the amount of code generated for each divided area is computed. In this case, the individual RD costs are 15, 10, 10, and 5. Accordingly, the CU division as shown in FIG. 3 is obtained.

Here, it is assumed that flag information that indicates the state of the CU division requires an amount "10" of overhead information for each flag. Since the layer of the 64×64 (pixels) size has no overhead information, the amount of generated code directly coincides with the RD cost.

For the layer of the 32×32 (pixels) size, the amount of generated code is 200+210+300+220=930, and the overhead information is 10×4, that is, 40. The sum thereof is 970 which is the RD cost. This value is smaller than the RD cost for the 64×64 size, which is 1000 in consideration of the overhead information.

In this case, the total amount of information can be smaller when selecting the 32×32 size by performing the 4-division of the relevant CU.

Similarly, the total amount of information of CU "15" can be smaller by performing the relevant division, and the total amount of information of CU "16" can be smaller by further performing the division.

Here, the RD cost is defined as the sum of the amount of generated information and the overhead information. A CU division pattern which reduces the RD cost (i.e., the sum of the amount of generated information and the overhead information which is generated according to the division) is extracted.

In addition, the sizes of the CU, PU, and TU have a relationship of CU≥PU. In the inter prediction, there is a relationship of CU≥TU (in some cases, a relationship of PU<TU is obtained). Furthermore, in the intra prediction, there is a relationship of PU≥TU.

First Embodiment

Below, the configuration of an apparatus will be explained, where the apparatus performs a CU determination operation to which a TU size determination method according to a first embodiment of the present invention is applied.

Figure 4:
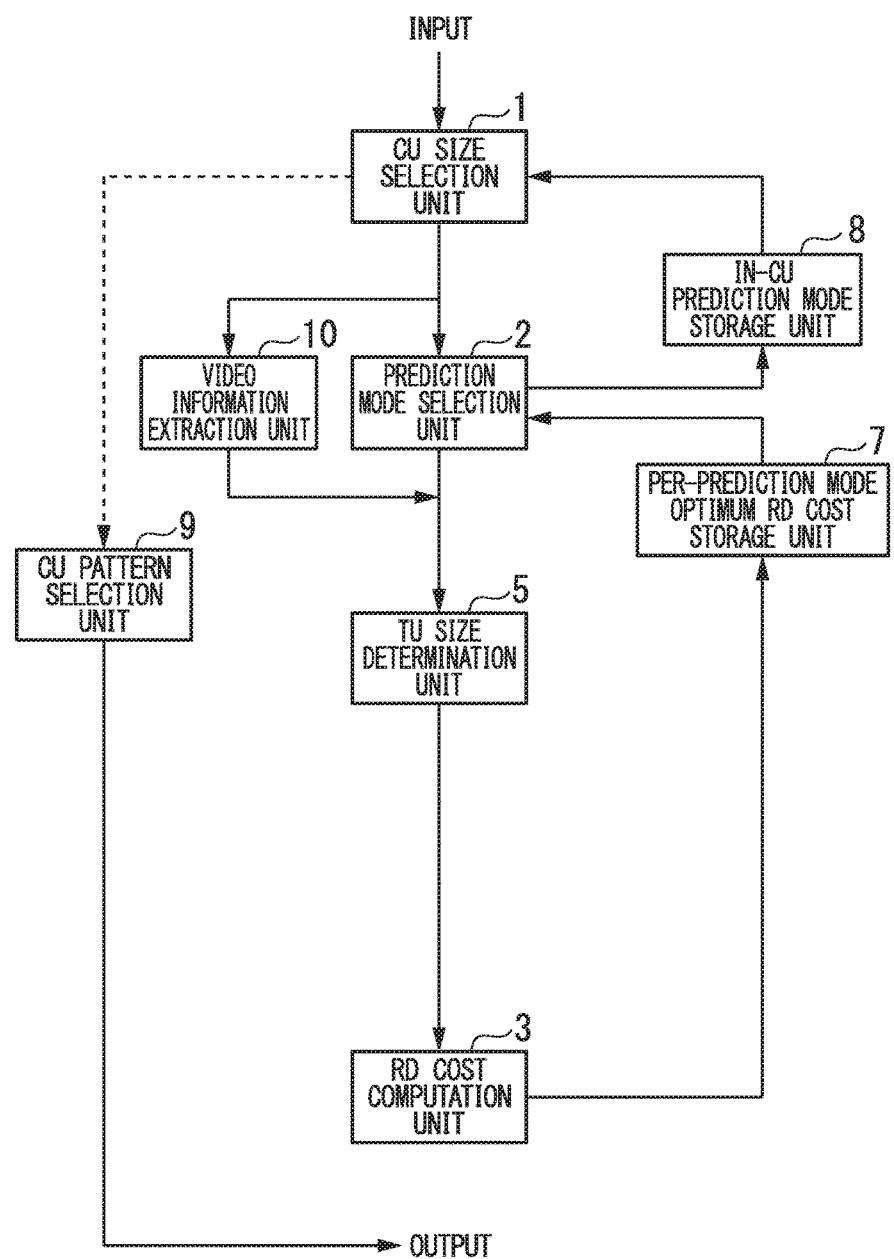
FIG. 4 is a block diagram showing the configuration of the apparatus that performs the CU determination operation to which the TU size determination method of a first embodiment of the present invention is applied.

FIG. 4 is a block diagram showing the configuration of the apparatus that performs the CU determination operation to which the TU size determination method of the present embodiment is applied. In FIG. 4, processing units identical to those in FIG. 4 are given identical reference numbers, and explanations thereof are simplified.

First, the CU size selection unit 1 selects a CU having a size of, for example, 64×64 (pixels), as an LCU.

A video information extraction unit 10 extracts video information at a desired block size.

The prediction mode selection unit 2 selects from a plurality of prediction modes, for example, "prediction mode 1", so as to perform a prediction process.

The TU size determination unit 5 determines the TU size (pattern) based on the selected prediction mode (i.e., the block size applied to the prediction process) and the extracted video information (e.g., "activity" explained later).

The RD cost computation unit 3 computes the RD cost. This RD cost is utilized as an optimum RD cost in the prediction mode 1.

A similar process as described above is performed for each of all prediction modes (i.e., prediction mode 2, prediction mode 3, . . . ) so as to determine an optimum prediction mode for the CU having the size of 64×64. Then, in the in-CU prediction mode storage unit 8, the optimum prediction mode is stored.

Next, the CU size selection unit 1 executes a similar prediction mode determination until a smallest selectable CU size is obtained from the CU size of 32×32.

After all CU sizes are processed, the CU pattern selection unit 9 selects a CU pattern having an optimum RD cost in the LCU. Accordingly, the processing within the relevant LCU is completed.

Figure 5:
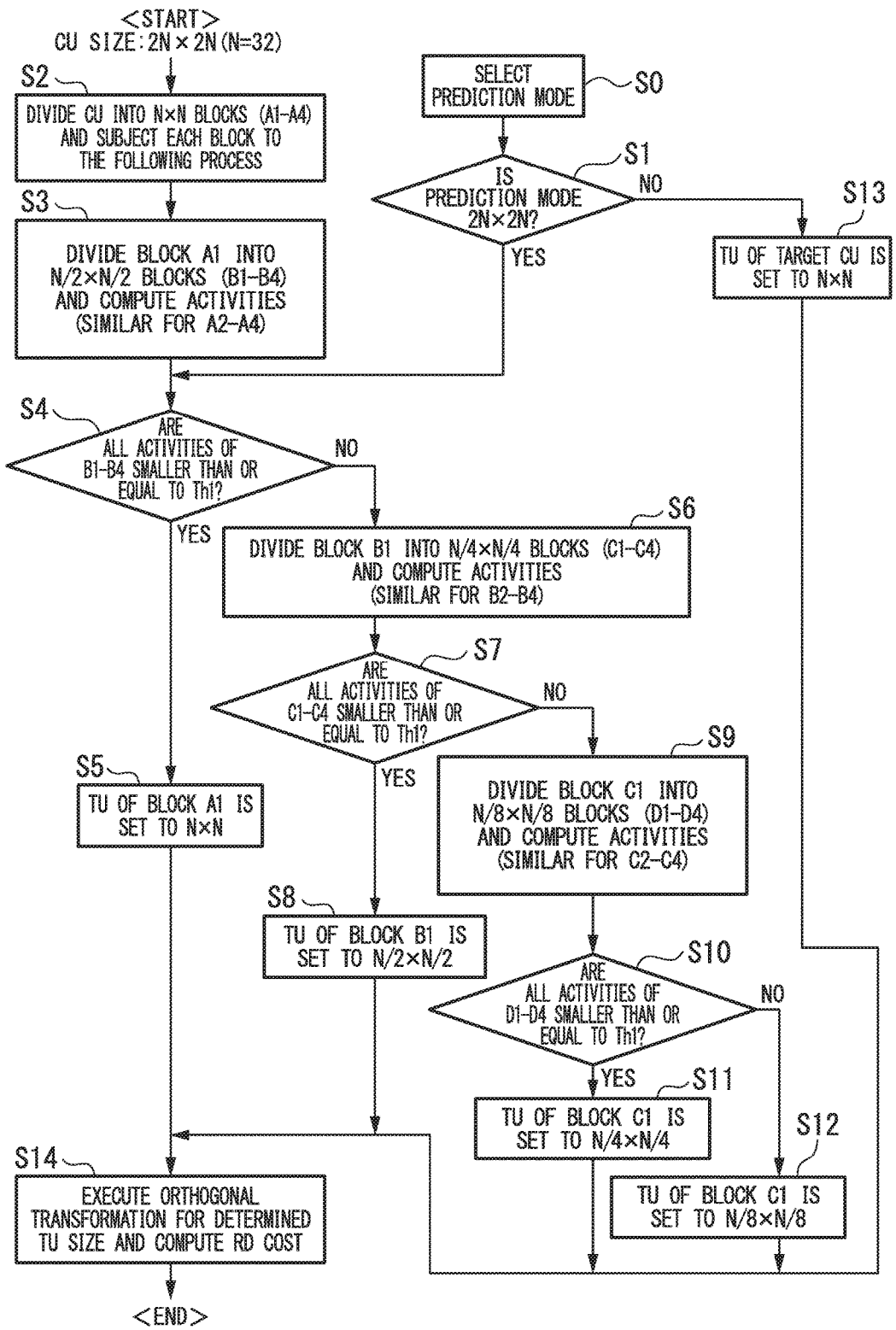
FIG. 5 is a flowchart showing the operation of the TU size determination of the apparatus of FIG. 4.

With reference to FIG. 5, an operation of the TU size determination performed in the apparatus of FIG. 4 will be explained. FIG. 5 is a flowchart showing the operation of the TU size determination of the apparatus of FIG. 4.

In the operation shown in FIG. 5, "activity" (i.e., an activity value that indicates the degree of complexity of each image) is utilized as the video information. The utilized activity is defined to be an activity computed based on an original image or an activity computed from a decoded image of a previously-encoded frame (i.e., a frame prior to an encoding target frame in order of encoding). In the following explanation, the activity computed from the original image is used as a premise.

First, the CU size selection unit 1 selects the 64×64 size as the CU size.

The prediction mode selection unit 2 selects the prediction mode (prediction size which is here PU) (see step S0) and determines whether or not the prediction mode is 2N×2N (the same size as that of CU: N=32) (see step S1).

Simultaneously, the video information extraction unit 10 divides the CU into N×N blocks (A1 to A4) and subjects each block to the following process (see step S2).

For blocks (B1 to B4) obtained by dividing the first block A1 into four blocks (i.e., A1 is divided in half vertically and horizontally), each having a size of N/2×N/2, the video information extraction unit 10 computes individual activities (i.e., activity values) Act_B1 to Act_B4 (see step S3).

Then, it is determined whether or not the prediction mode is 2N×2N (see step S1) and all computed activities Act_B1 to Act_B4 are each smaller than or equal to a threshold Th1 (see step S4). If "YES", the TU size of block A1 is determined to be N×N (see step S5).

If any one of Act_B1 to Act_B4 is larger than the threshold Th1 (i.e., "NO" in the determination of step S4) (for example, Act_B1>Th1), then the blocks B1 to B4 are each divided into blocks, each having a size of N/4×N/4 pixels (see step S6).

For example, the blocks obtained by dividing B1 into N/4×N/4 (pixels)-size blocks are defined to be blocks C1 to C4, and activities thereof (Act_C1 to Act_C4) are computed.

Next, it is determined whether or not all activities Act_C1 to Act_C4 are each smaller than or equal to the threshold Th1 (see step S7). If "YES", the TU size of block B1 is determined to be N/2×N/2 (see step S8).

If any one of Act_C1 to Act_C4 is larger than the threshold Th1 (i.e., "NO" in the determination of step S7) (for example, Act_C1>Th1), then the blocks C1 to C4 are each divided into blocks, each having a size of N/8×N/8 pixels.

For example, the blocks obtained by dividing C1 into N/8×N/8 (pixels)-size blocks are defined to be blocks D1 to D4, and activities thereof (Act_D1 to Act_D4) are computed (see step S9).

Next, it is determined whether or not all activities Act_D1 to Act_D4 are each smaller than or equal to the threshold Th1 (see step S10). If "YES", the TU size of block C1 is determined to be N/4×N/4 (see step S11).

Otherwise (i.e., "YES" in the determination of step S10), the TU size of block C1 is determined to be N/8×N/8 (see step S12).

The operation applied to blocks A1, B1, and C1 is also applied to blocks A2 to A4, B2 to B4, and C2 to C4.

If it is determined "NO" in step S1, the TU size of the target CU is determined to be N×N (see step S13).

Next, the RD cost computation unit 3 executes orthogonal transformation for the determined TU size and pattern (a plurality of TU sizes may be employed in the CU) so as to compute the RD cost and stores the computed result in the per-prediction mode optimum RD cost storage unit 7 (see step S14).

Similarly, RD cost computation is performed by utilizing each prediction process (e.g., inter or intra), that is, each of other prediction modes, and a TU size determined therefor, so as to store an optimum prediction mode at the CU size of 64×64 into the in-CU prediction mode storage unit 8.

Next, the CU size selection unit 1 executes a similar optimum prediction mode determination operation for CU sizes from 32×32 to a smallest selectable size.

After all CU sizes are processed, the CU pattern selection unit 9 selects a CU pattern (i.e., a set of CU, PU, and TU) having an optimum RD cost in the LCU.

In the above operation, the conditional branch is performed by determining whether or not all four activities are smaller than or equal to a threshold. However, similar effects can be obtained by, for example, performing the conditional branch by determining whether or not three or less of the activities are smaller than or equal to a threshold.

In addition, although a single threshold Th1 is employed above, similar effects can be obtained when different thresholds are assigned to Act_B1 and Act_C1. Additionally, the threshold may be determined by using a quantization value.

Second Embodiment

Figure 6:
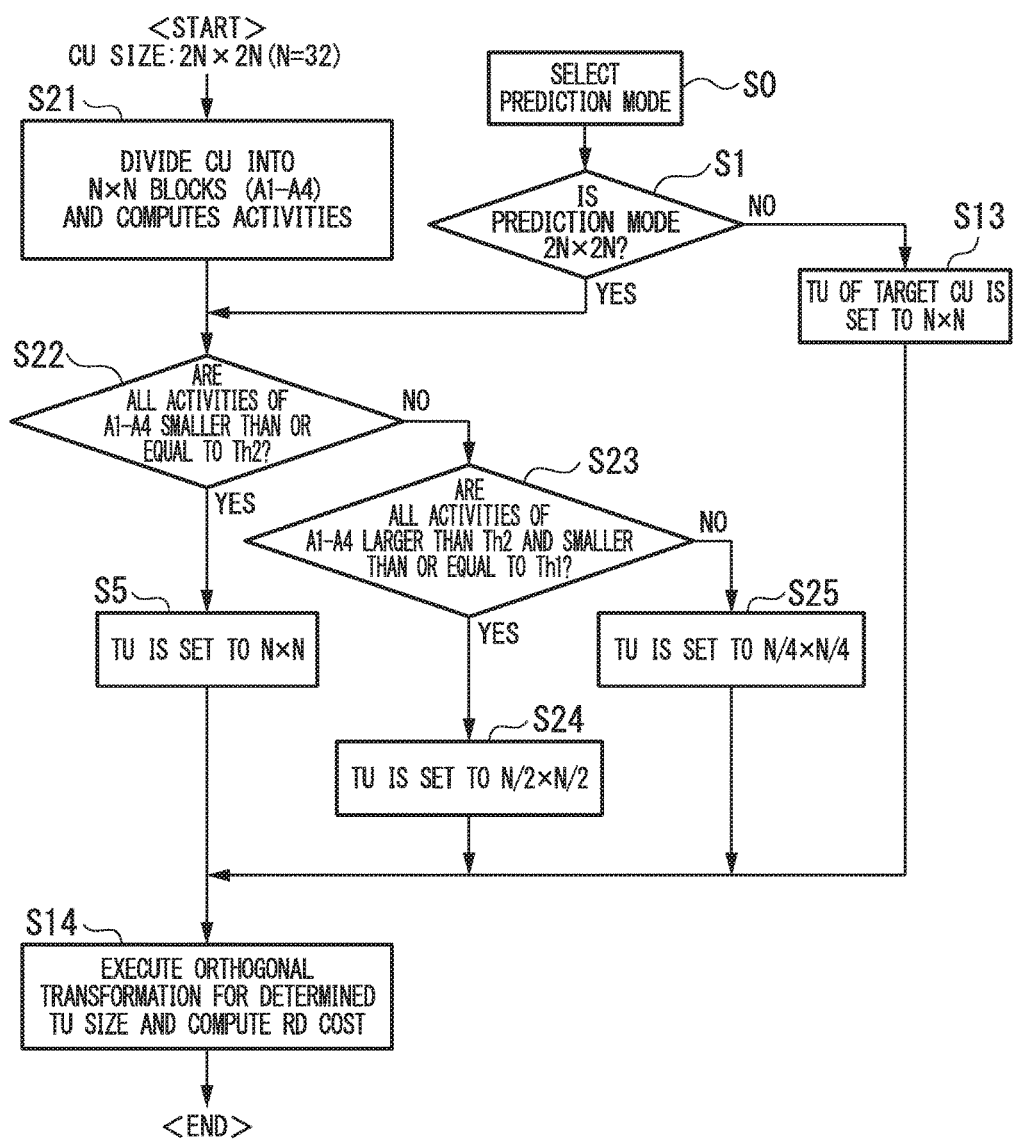
FIG. 6 is a flowchart showing the operation of a TU size determination process in a second embodiment of the present invention, which is performed by the apparatus shown in FIG. 4.

Below, a CU determination operation to which a TU size determination method according to a second embodiment of the present invention is applied. FIG. 6 is a flowchart showing the operation of a TU size determination process in the second embodiment, which is performed by the apparatus shown in FIG. 4.

In FIG. 6, processing steps identical to those in FIG. 5 are given identical reference symbols, and explanations thereof are omitted.

In the operation shown in FIG. 6, the activity (i.e., activity value) is also utilized as the video information. In the first embodiment, the block division is performed in several steps, and in each of these steps, a process utilizing a threshold is executed so as to determine the TU size. In contrast, in the second embodiment, the block is performed in one step, and a single TU size is determined by utilizing a plurality of thresholds. Accordingly, a single TU size is employed in the relevant CU. Therefore, the operation and system configuration of the second embodiment are simpler than those of the first embodiment.

First, the CU size selection unit 1 selects the 64×64 size as the CU size. The prediction mode selection unit 2 selects the prediction mode (prediction size) (see step S0) and determines whether or not the prediction mode is 2N×2N (the same size as that of CU) (see step S1).

Simultaneously, the video information extraction unit 10 divides the CU into N×N blocks (A1 to A4) and computes activities Act_A1 to Act_A4 of the individual divided blocks (see step S21).

Then, it is determined whether or not the prediction mode is 2N×2N (see step S1) and all activities Act_A1 to Act_A4 are each smaller than or equal to a threshold Th2 (see step S22). If "YES", the (single) TU size is determined to be N×N (see step S5).

If the condition that all activities Act_A1 to Act_A4 are smaller than or equal to the threshold Th2 is not satisfied, then it is determined whether or not all activities Act_A1 to Act_A4 are each larger than the threshold Th2 and simultaneously smaller than or equal to a threshold Th1 (see step S23). If "YES", the TU size is determined to be N/2×N/2 (see step S24), otherwise the TU size is determined to be N/4×N/4 (see step S25).

Next, for the determined single TU size, orthogonal transformation (after intra or inter prediction) is performed (see step S14).

Similarly, each of the CU sizes from 32×32 to 8×8 (pixels) is subjected to the intra/inter prediction and orthogonal transformation by utilizing the determined single TU size, so as to compute an optimum RD cost of each CU size and determine the CU pattern in the relevant LCU.

In the present embodiment, the above thresholds may be determines by a quantization value.

Third Embodiment

Figure 7:
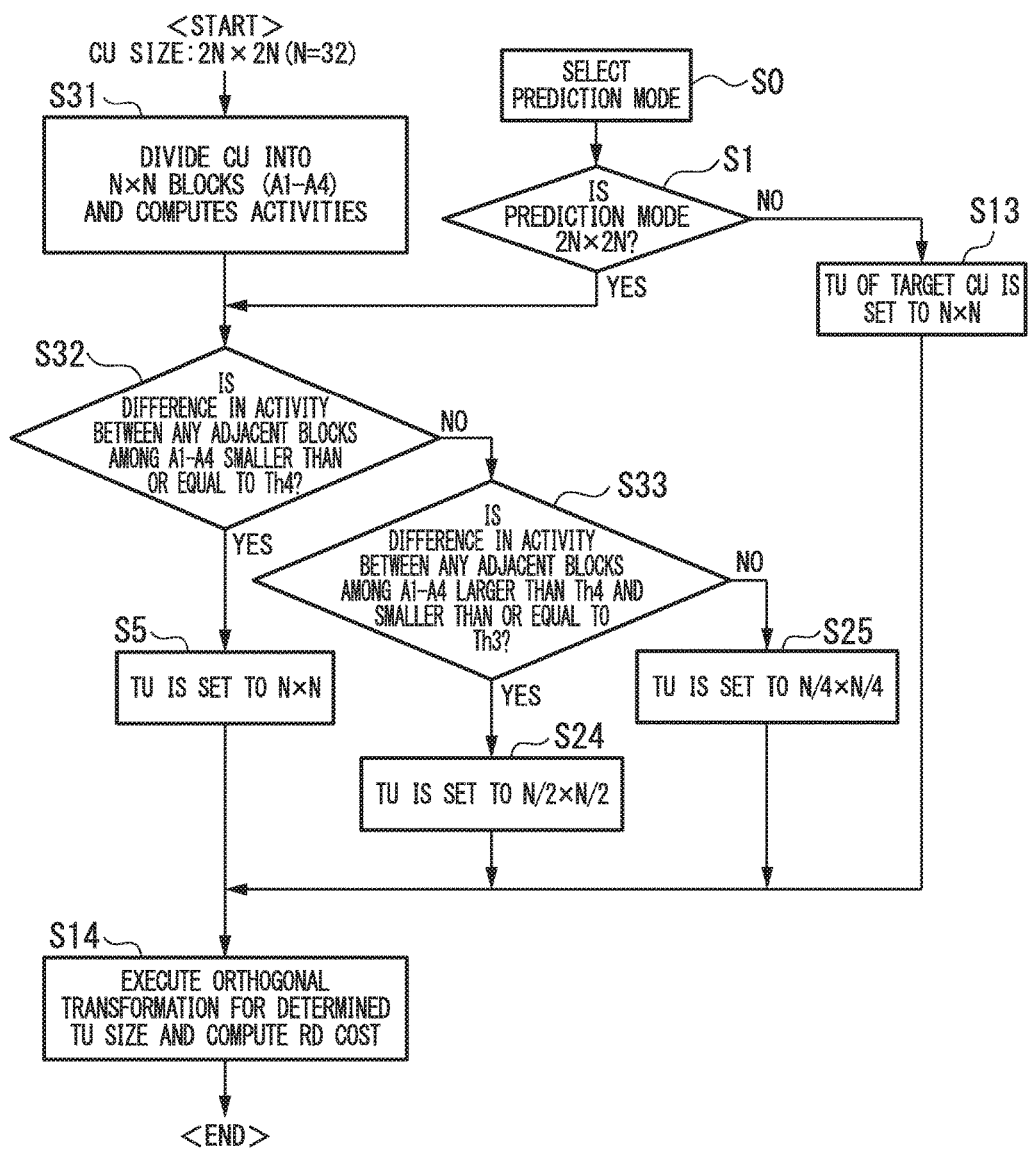
FIG. 7 is a flowchart showing the operation of a TU size determination process in a third embodiment of the present invention, which is performed by the apparatus shown in FIG. 4.

Below, a CU determination operation to which a TU size determination method according to a third embodiment of the present invention is applied. FIG. 7 is a flowchart showing the operation of a TU size determination process in the third embodiment, which is performed by the apparatus shown in FIG. 4.

In FIG. 7, processing steps identical to those in FIG. 6 are given identical reference symbols, and explanations thereof are omitted.

In the operation shown in FIG. 7, the activity (i.e., activity value) is also utilized as the video information. In the second embodiment, the activity values themselves are compared with thresholds. In contrast, in the third embodiment, a difference in activity between adjacent blocks is utilized. In this case, a state of peripheral blocks is referred to and thus TU division is less performed in comparison with the first embodiment. Therefore, the third embodiment may be advantageous when the encoding is performed with a relatively low bit rate.

First, the CU size selection unit 1 selects the 64×64 size as the CU size. The prediction mode selection unit 2 selects the prediction mode (see step S0) and determines whether or not the prediction mode (prediction size) is 2N×2N (here, N=32 again, that is, the same size as that of CU) (see step S1).

Simultaneously, the video information extraction unit 10 divides the CU into N×N blocks (A1 to A4) and computes activities Act_A1 to Act_A4 of the individual divided blocks (see step S21).

Then, it is determined whether or not the prediction mode is 2N×2N (see step S1) and difference in the activity between any two adjacent blocks among the four divided blocks (e.g., difference in the activity between blocks A1 and A2: Act_diff=Act_A1−Act_A2) is smaller than or equal to a threshold Th4 (see step S32). If "YES" (Act_diff≤Th4), the (single) TU size is determined to be N×N (see step S5). That is, when any one of the blocks A1 to A4 has an adjacent block which produces an activity difference smaller than or equal to the threshold Th4, then the result of the determination is "YES".

If the result of the determination in step S32 is "NO", it is determined in a similar manner whether or not difference in the activity between any two adjacent blocks among the four divided blocks is smaller than or equal to a threshold Th3 and simultaneously larger than Th4 (see step S33). If "YES" (Th4<Act_diff≤Th3), the TU size is determined to be N/2×N/2 (see step S24).

When the above difference is larger than the threshold Th3 (i.e., "NO" in step S33, that is, Act_diff>Th3), the TU size is determined to be N/4×N/4 (see step S25).

If the prediction size is not 2N×2N, that is, the size is 2N×N, N×N, or the like, the TU size is determined to be N×N regardless of the activity of the CU (see step S13).

Next, for the determined single TU size, orthogonal transformation (after intra or inter prediction) is performed so as to compute an optimum RD cost for the CU size of 64×64 (see step S14).

The above "adjacent" form may be established in any direction, such as a horizontal or vertical direction. Additionally, in the present embodiment, the threshold may be determined by using a quantization value.

Similarly, each of the CU sizes from 32×32 to 8×8 is subjected to the intra/inter prediction and orthogonal transformation by utilizing the determined single TU size, so as to compute an optimum RD cost and determine the CU pattern in the relevant LCU.

In addition, each activity for the blocks (A1 to A4) can be computed based on an original image or a decoded image (if the original image was already encoded) of the relevant block.

Figure 8:
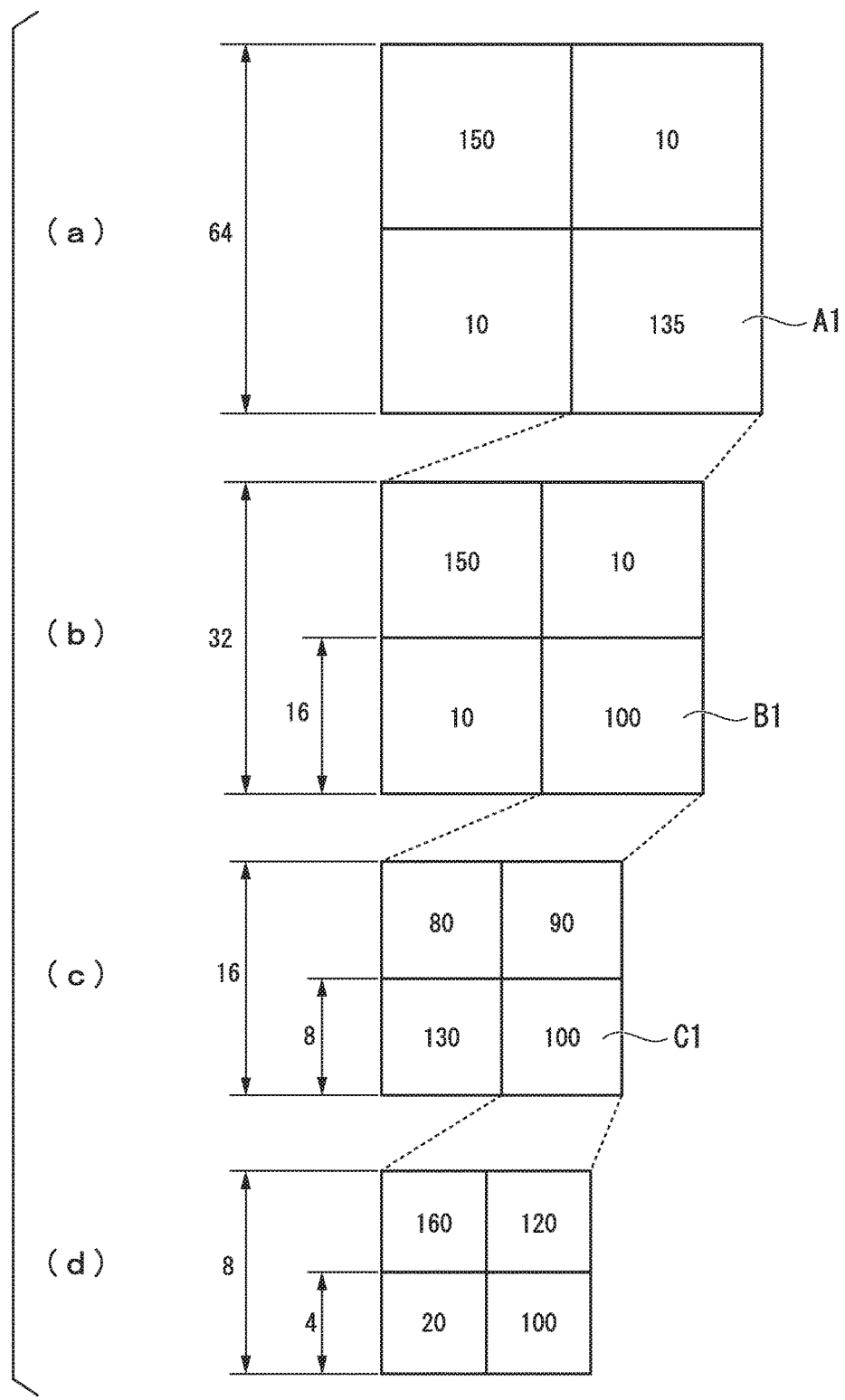
FIG. 8 is a diagram utilized to explain the operation performed when the CU size is 64×64.
Figure 9:
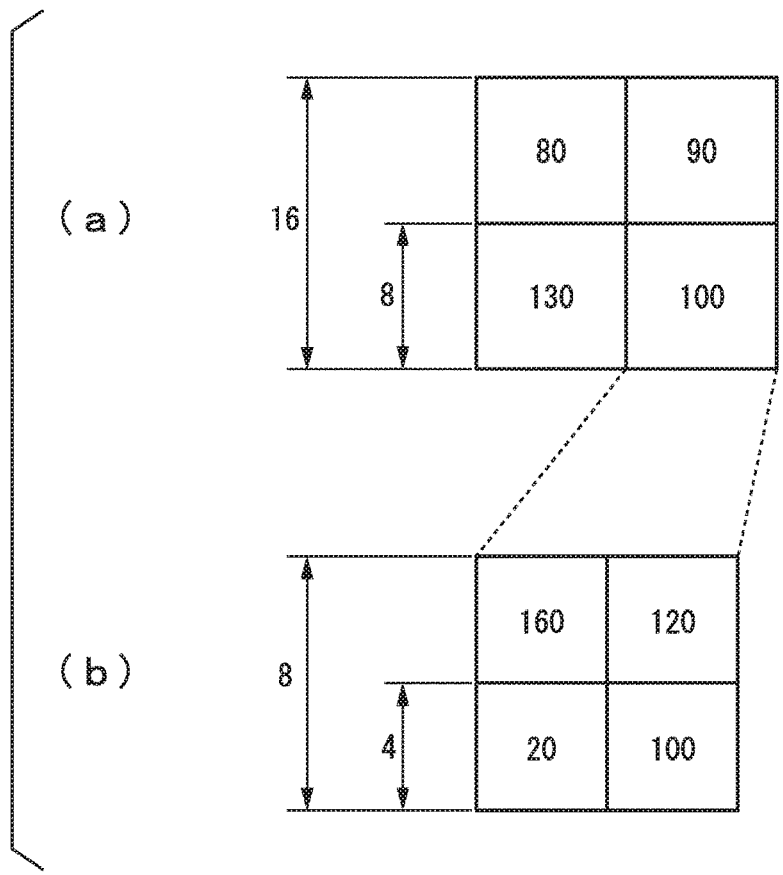
FIG. 9 is a diagram utilized to explain the operation performed when the CU size is 32×32.
Figure 10:
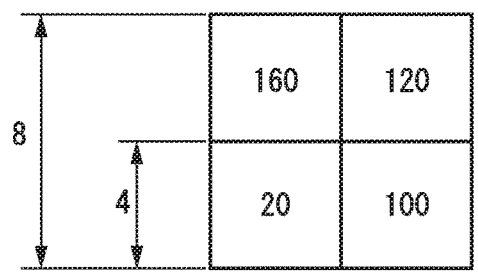
FIG. 10 is a diagram utilized to explain the operation performed when the CU size is 16×16 pixels.

Now with reference to FIGS. 8 to 10, the TU size determination operation in the first embodiment will be further explained with respect to the 64×64, 32×32, and 16×16 (pixels) sizes.

FIG. 8 is a diagram utilized to explain the operation performed when the CU size is 64×64. FIG. 9 is a diagram utilized to explain the operation performed when the CU size is 32×32. FIG. 10 is a diagram utilized to explain the operation performed when the CU size is 16×16 pixels.

First, the operation performed when the CU size is 64×64 will be explained. In the first step, the CU is divided into four 32×32 blocks A1 to A4 (i.e., divided in half vertically and horizontally). Each of the 32×32 blocks is further divided in half vertically and horizontally, and "activity" is computed for each of obtained 16×16 (pixels) blocks (e.g., blocks B1 to B4 from block A1) (see part (a) of FIG. 8, division of A1 into blocks B1 to B4 itself is not shown). The other blocks A2 to A4 are similarly processed.

Next, if the individual activities of the blocks B1 to B4 are each smaller than or equal to a threshold, the TU size of block A1 is determined to be 32×32 (i.e., the relevant CU is not divided). In contrast, if any one of the 16×16 blocks B1 to B4 is larger than the threshold, then the blocks B1 to B4 are each further divided into four blocks so that the TU size of block A1 is 16×16 or smaller (any one of the possible sizes) (see part (b) of FIG. 8).

Next, if the individual activities of, for example, blocks C1 to C4 divided from the block B1 are each smaller than or equal to a threshold, the TU size of block B1 is determined to be 16×16. In contrast, if any one of the 8×8 blocks C1 to C4 is larger than the threshold, then the blocks C1 to C4 are each further divided into four blocks so that the TU size of block B1 is 8×8 or smaller (any one of the possible sizes) (see part (c) of FIG. 8).

Next, if the individual activities of, for example, blocks D1 to D4 divided from the block C1 are each smaller than or equal to a threshold, the TU size of block C1 is determined to be 8×8. In contrast, if any one of the 4×4 blocks D1 to D4 is larger than the threshold, then the TU size of block C1 is determined to be 4×4. (see part (d) of FIG. 8).

Next, the operation performed when the CU size is 32×32 will be explained (since this operation is similar to the above operation, the explanation thereof will be appropriately simplified). In the first step, the CU is divided into four 16×16 blocks (i.e., divided in half vertically and horizontally). Each of the 16×16 blocks is further divided in half vertically and horizontally, and "activity" is computed for each of obtained 8×8 blocks (refer to part (a) of FIG. 8). If the individual activities of the four blocks are each smaller than or equal to a threshold, the TU size of the relevant block is determined to be 16×16. Otherwise, the relevant 16×16 block is further divided into four blocks so that the TU size for the block is 8×8 or smaller (see part (a) of FIG. 9).

Next, if the individual activities of four 4×4 blocks divided from an 8×8 block are each smaller than or equal to a threshold, the TU size of the relevant 8×8 block is determined to be 8×8. Otherwise, the TU size of this 8×8 block is determined to be 4×4 (see part (b) of FIG. 9).

Next, the operation performed when the CU size is 16×16 will be explained (similarly, the explanation will be appropriately simplified). In the first step, the CU is divided into four 8×8 blocks. Each of the 8×8 blocks is further divided in half vertically and horizontally, and "activity" is computed for each of obtained 4×4 blocks. If the individual activities of the four blocks are each smaller than or equal to a threshold, the TU size of the relevant 8×8 block is determined to be 8×8. Otherwise, the TU size of this 8×8 block is determined to be 4×4 (see FIG. 10).

Fourth Embodiment

Figure 11:
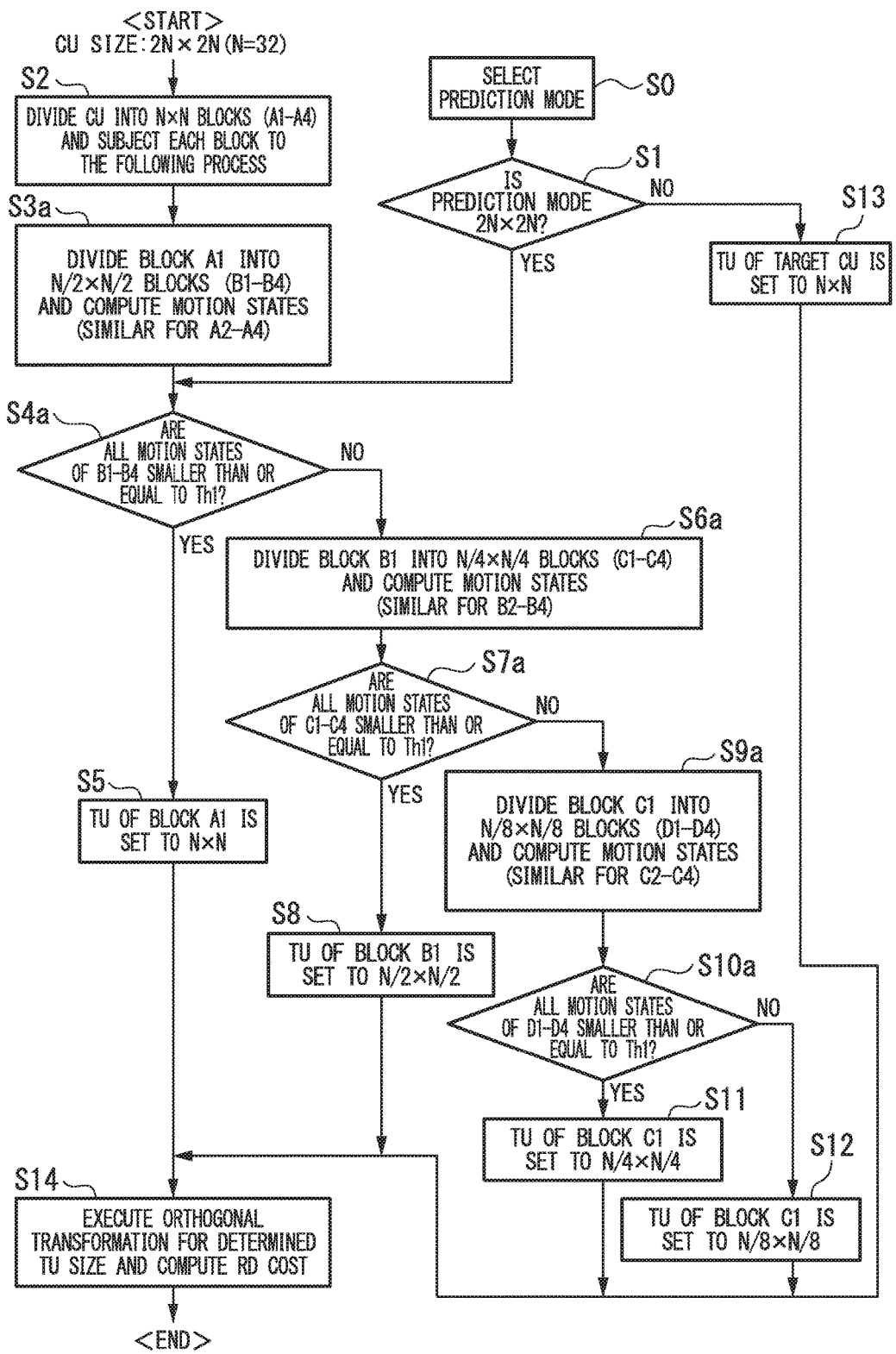
FIG. 11 is a flowchart showing the operation of a TU size determination process in a fourth embodiment of the present invention, which is performed by the apparatus shown in FIG. 4.

Below, a CU determination operation to which a TU size determination method according to a fourth embodiment of the present invention is applied. FIG. 11 is a flowchart showing the operation of a TU size determination process in the fourth embodiment, which is performed by the apparatus shown in FIG. 4.

In FIG. 11, processing steps identical to those in FIG. 5 are given identical reference symbols, and explanations thereof are omitted.

In the operation shown in FIG. 11, a motion state (e.g., a size of a motion region explained later) of a processing target block is utilized as video information.

In comparison with the first embodiment which employs the activity, the fourth embodiment utilizes the motion state of the processing target block instead of the activity. When the motion state of the processing target block is employed instead of the activity, improvement of performance, in particular, for the CU pattern setting in the inter encoding is anticipated. On the contrary, the present method cannot be applied to the intra encoding.

The utilized motion state here is a motion state which is newly computed for a target frame, or a motion state of a block in a previously-encoded frame (i.e., a frame prior to the target frame in the encoding order) where this block is in the same region as that of the target frame. In the following explanation, the motion state which is newly computed for a target frame is employed as a premise.

First, the CU size selection unit 1 selects the 64×64 size as the CU size. The prediction mode selection unit 2 selects the prediction mode (see step S0) and determines whether or not the prediction mode (prediction size) is 2N×2N (the same size as that of CU) (see step S1). Simultaneously, the video information extraction unit 10 divides the CU into N×N blocks (A1 to A4) and subjects each block to the following process (see step S2).

For blocks (B1 to B4) obtained by dividing the block A1 into four blocks (i.e., A1 is divided in half vertically and horizontally), each having a size of N/2×N/2, the video information extraction unit 10 computes individual motion states Mot_B1 to Mot_B4 (see step S3a).

The motion state here may be numeric value information that indicates whether or not the relevant region is a motion region (where it is estimated that there is a motion), an amount (size) of the motion region, or the like. A similar effect can be obtained regardless of such a manner of the motion state.

Then, it is determined whether or not the prediction mode is 2N×2N (see step S1) and all motion states Mot_B1 to Mot_B4 are each smaller than or equal to a threshold Th1 (see step S4a). If "YES", the TU size of block A1 is determined to be N×N (see step S5).

If any one of Mot_B1 to Mot_B4 is larger than the threshold Th1 (i.e., "NO" in the determination) (for example, Mot_B1>Th1), then the blocks B1 to B4 are each divided into blocks, each having a size of N/4×N/4 (see step S6a).

For example, the blocks obtained by dividing B1 into N/4×N/4-size blocks are defined to be blocks C1 to C4, and motion states thereof (Mot_C1 to Mot_C4) are computed.

Next, it is determined whether or not all motion states Mot_C1 to Mot_C4 are each smaller than or equal to the threshold Th1 (see step S7a). If "YES", the TU size of block B1 is determined to be N/2×N/2 (see step S8).

If any one of Mot_C1 to Mot_C4 is larger than the threshold Th1 (i.e., "NO" in the determination of step S7a) (for example, Mot_C1>Th1), then the blocks C1 to C4 are each divided into blocks, each having a size of N/8×N/8.

For example, the blocks obtained by dividing C1 into N/8×N/8-size blocks are defined to be blocks D1 to D4, and motion states thereof (Mot_D1 to Mot_D4) are computed (see step S9a).

Next, it is determined whether or not all motion states Mot_D1 to Mot_D4 are each smaller than or equal to the threshold Th1 (see step S10a). If "YES", the TU size of block C1 is determined to be N/4×N/4 (see step S11).

Otherwise, the TU size of block C1 is determined to be N/8×N/8 (see step S12).

The operation applied to blocks A1, B1, and C1 is also applied to blocks A2 to A4, B2 to B4, and C2 to C4.

If it is determined "NO" in step S1, the TU size of the target CU is determined to be N×N (see step S13).

Next, the RD cost computation unit 3 computes the RD cost for the determined TU size and stores the computed result in the per-prediction mode optimum RD cost storage unit 7 (see step S14).

Similarly, each of the CU sizes from 32×32 to 8×8 is subjected to the intra/inter prediction and orthogonal transformation by utilizing the determined TU size, so as to compute an optimum RD cost of each CU size and determine the CU pattern in the relevant LCU.

In the present embodiment, the threshold may be determined by utilizing a quantization value or a frame rate. In addition, a process to determine a motion state can be more easily performed that a motion vector computing process explained later.

Fifth Embodiment

Figure 12:
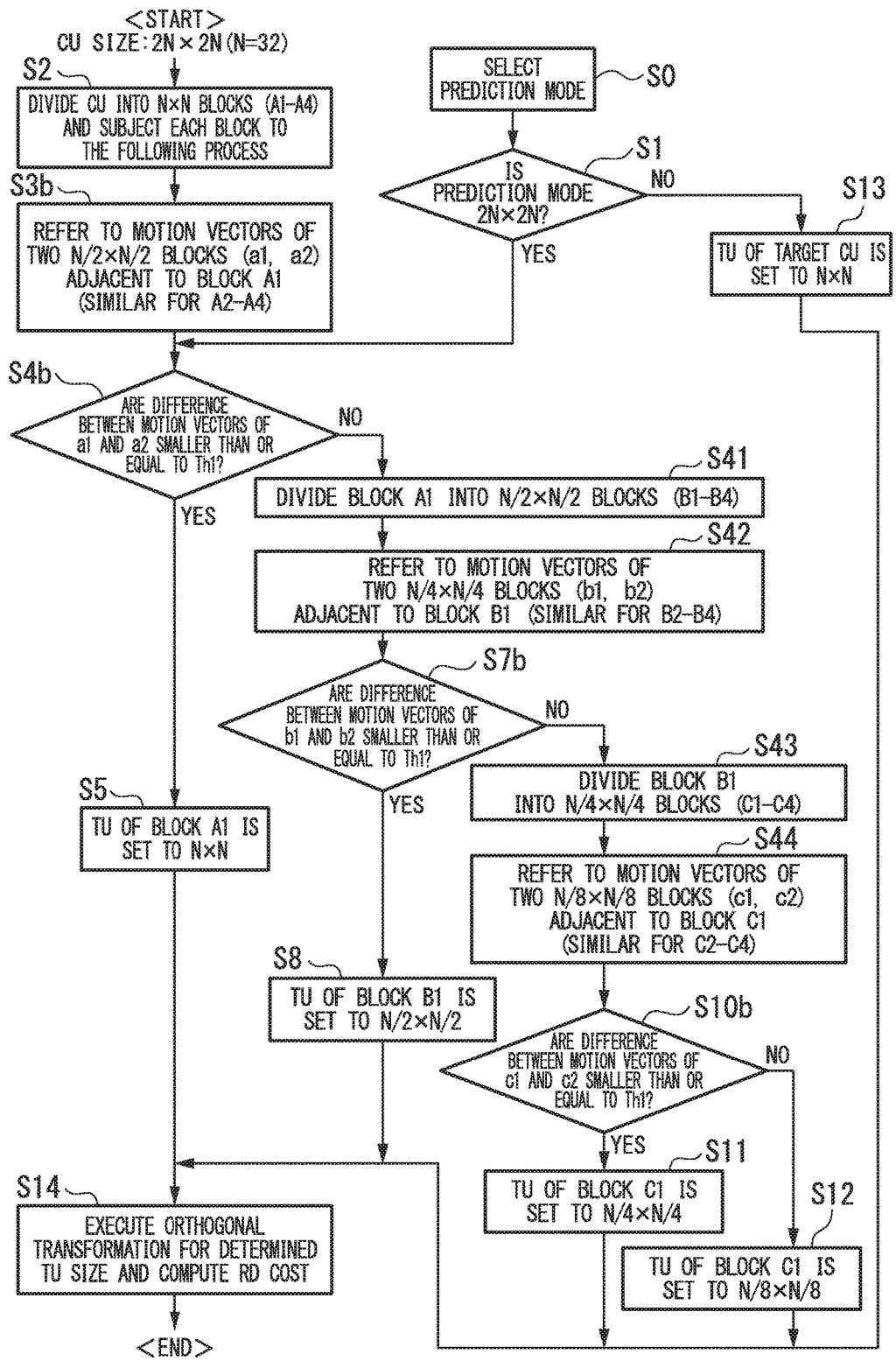
FIG. 12 is a flowchart showing the operation of a TU size determination process in a fifth embodiment of the present invention, which is performed by the apparatus shown in FIG. 4.

Below, a CU determination operation to which a TU size determination method according to a fifth embodiment of the present invention is applied. FIG. 12 is a flowchart showing the operation of a TU size determination process in the fifth embodiment, which is performed by the apparatus shown in FIG. 4.

In FIG. 12, processing steps identical to those in FIG. 11 are given identical reference symbols, and explanations thereof are omitted.

In the operation shown in FIG. 12, motion vectors of blocks adjacent to a processing target block are utilized as video information.

In comparison with the fourth embodiment which employs the motion state (whether or not the target region is a motion region, or the size of the motion region) of the processing target block as a threshold, the fifth embodiment utilizes the motion vectors of blocks (e.g., previously-encoded blocks) adjacent to the processing target block.

Therefore, a state of peripheral blocks is referred to and thus the frequency of TU division processing is reduced in comparison with the fourth embodiment. Accordingly, the fifth embodiment may be advantageous when the encoding is performed with a relatively low bit rate. Additionally, since the motion vectors are utilized, highly accurate motion information can be obtained. However, the operation is more complex in comparison with the above-described motion state detection process.

First, the CU size selection unit 1 selects the 64×64 size as the CU size. The prediction mode selection unit 2 selects the prediction mode (see step S0) and determines whether or not the prediction mode (prediction size) is 2N×2N (the same size as that of CU) (see step S1). Simultaneously, the video information extraction unit 10 divides the CU into N×N blocks (A1 to A4) (i.e., CU is divided in half vertically and horizontally) (see step S2) and refers to motion vectors (Mv_a1 and Mv_a2) of a plurality of blocks having a size of N/2×N/2 (any number of blocks, for example, two blocks a1 and a2) adjacent to block A1 (see step S3b). Such a plurality of "N/2×N/2" blocks may be contact to each other or separate from each other.

Next, it is determined whether or not a difference between the two motion vectors is smaller than or equal to a threshold Th1 (see step S4b). If "YES" (i.e., Mv_a1−Mv_a2≤Th1), it can be assumed that in block A1, direction and size of motion is almost regular. That is, when the motion is regular, the TU size is set to N×N (see step S5).

In contrast, if the motion is not regular (i.e., "NO" in step S4b), the block A1 is divided into blocks (B1 to B4) having a size of N/2×N/2 (see step S41) and, for example, motion vectors (Mv_b1 and Mv_b2) of a plurality of blocks having a size of N/4×N/4 (e.g., two blocks b1 and b2) adjacent to block B1 are referred to (see step S42).

Next, it is determined whether or not a difference between the two motion vectors is smaller than or equal to a threshold Th1 (see step S7b). If "YES" (i.e., Mv_b1−Mv_b2≤Th1), the TU size for block B1 is set to N/2×N/2 (see step S8).

Otherwise, the block B1 is divided into blocks (C1 to C4) having a size of N/4×N/4 (see step S43) and, for example, motion vectors (Mv_c1 and Mv_c2) of a plurality of blocks having a size of N/8×N/8 (e.g., two blocks c1 and c2) adjacent to block C1 are referred to (see step S44).

Next, it is determined whether or not a difference between the two motion vectors is smaller than or equal to a threshold Th1 (see step S10b). If "YES" (i.e., Mv_c1−Mv_c2≤Th1), the TU size for block C1 is set to N/4×N/4 (see step S11). Otherwise, the TU size for block C1 is set to N/8×N/8 (see step S12).

The operation applied to blocks A1, B1, and C1 is also applied to blocks A2 to A4, B2 to B4, and C2 to C4.

If it is determined "NO" in step S1, the TU size of the target CU is determined to be N×N (see step S13).

Next, the RD cost computation unit 3 computes the RD cost for the determined TU size and stores the computed result in the per-prediction mode optimum RD cost storage unit 7 (see step S14).

Similarly, each of the CU sizes from 32×32 to 8×8 is subjected to the intra/inter prediction and orthogonal transformation by utilizing the determined single TU size, so as to compute an optimum RD cost of each CU size and determine the CU pattern in the relevant LCU.

Here, no restriction is applied for the number of utilized motion vectors of the adjacent blocks or whether or not motion vector information of previously-encoded blocks are utilized. Similar effects can be obtained for each case.

Additionally, in the present embodiment, the threshold may be determined by utilizing a quantization value or a frame rate.

Figure 13:
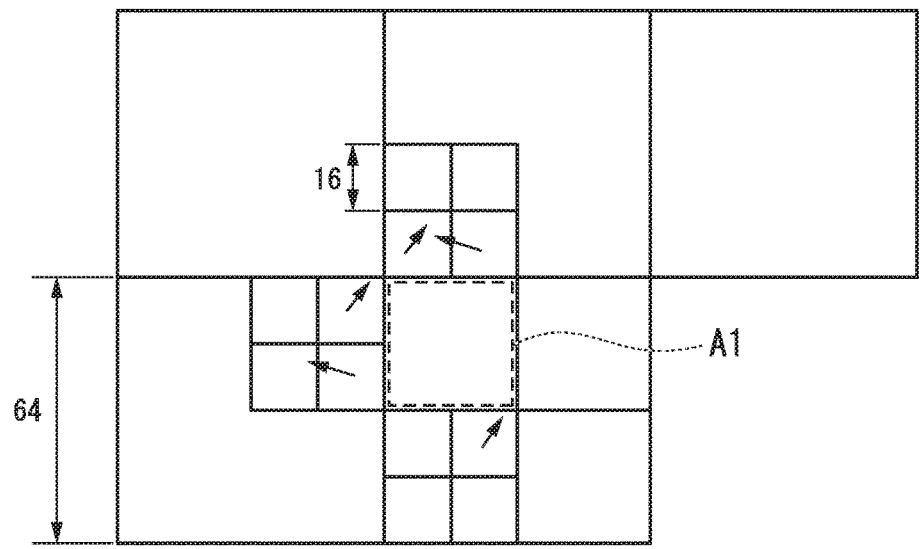
FIG. 13 is a diagram utilized to explain the TU size determination operation utilizing the motion vectors of adjacent blocks.
Figure 14:
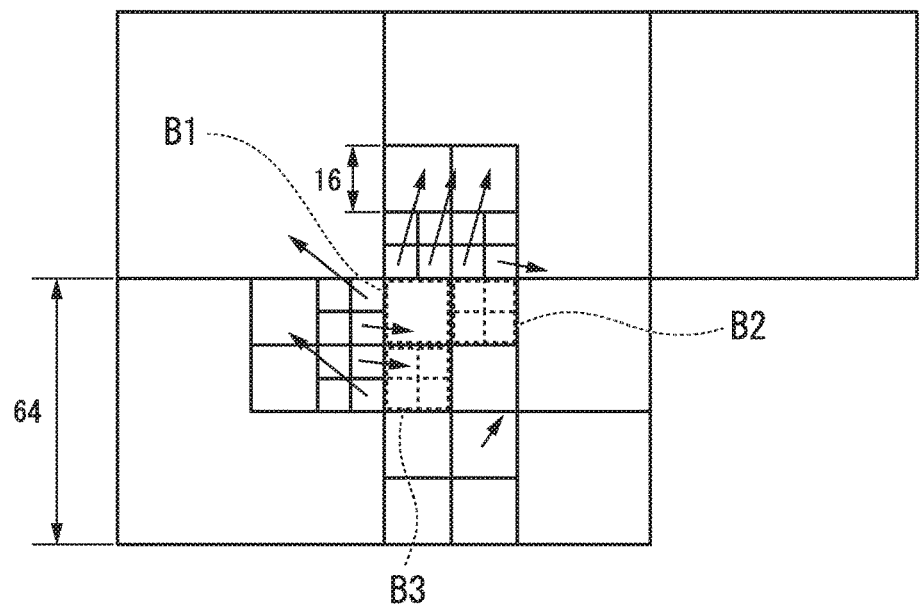
FIG. 14 is also a diagram utilized to explain the TU size determination operation utilizing the motion vectors of adjacent blocks.

Now with reference to FIGS. 13 and 14, the TU size determination operation utilizing the motion vectors of adjacent blocks in the fifth embodiment will be further explained.

FIGS. 13 and 14 are diagrams utilized to explain the TU size determination operation utilizing the motion vectors of adjacent blocks.

In FIG. 13, if there are two adjacent blocks (16×16) whose motion vectors are similar for a target block (see block A1 indicated by a dotted line) (when these motion vectors are compared with each other in the above step S4b), the relevant TU is not divided (i.e., TU=32×32).

In contrast, if the motion vectors of peripheral CUs considerably differ from the motion vector of the processing target block, TU is divided (i.e., TU=16×16 or smaller).

Additionally, in FIG. 14, if there are two adjacent blocks (8×8) whose motion vectors are similar for a target block (see block B1 indicated by a dotted line) (when these motion vectors are compared with each other in the above step S7b), the relevant TU is not divided (i.e., TU=16×16).

In contrast, if the motion vectors of peripheral CUs considerably differ from the motion vector of the processing target block, TU is divided (i.e., TU=8×8 or smaller: refer to blocks B2 and B3 which are indicated by dotted lines).

Similarly, although the following is not shown in the drawings, if there are two adjacent blocks (4×4) whose motion vectors are similar for a processing target block having a size of 8×8 (when these motion vectors are compared with each other in the above step S10b), the relevant TU is not divided (i.e., TU=8×8).

In contrast, if the motion vectors of peripheral CUs considerably differ from the motion vector of the processing target block, TU is divided (i.e., TU=4×4).

Sixth Embodiment

Figure 15:
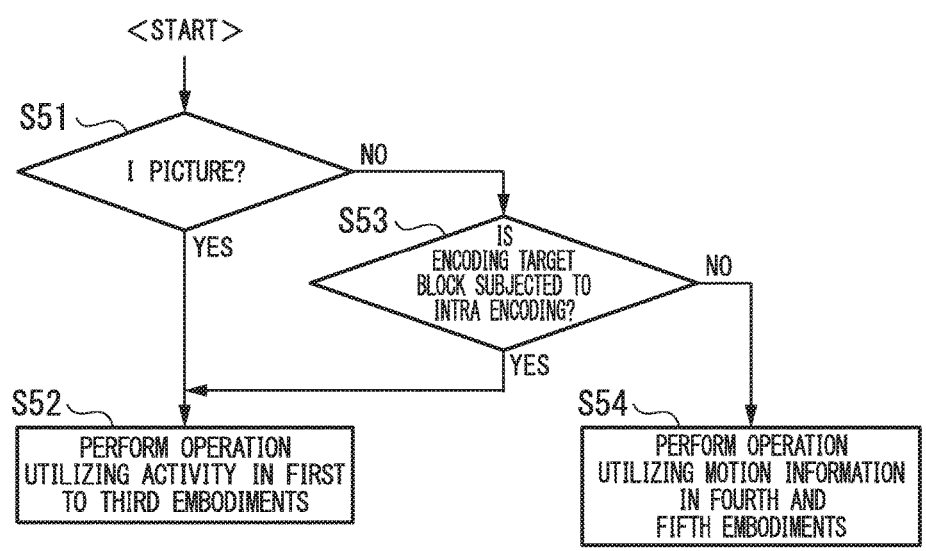
FIG. 15 is a flowchart showing the operation of a TU size determination process in a fifth embodiment of the present invention, which is performed by the apparatus shown in FIG. 4.

Below, a CU determination operation to which a TU size determination method according to a sixth embodiment of the present invention is applied. FIG. 15 is a flowchart showing the operation of a TU size determination process in the sixth embodiment, which is performed by the apparatus shown in FIG. 4.

In the operation shown in FIG. 15, for each picture type, information utilized in the relevant determination is switched between the activity and the motion state.

First, it is determined whether or not the current picture is an I picture that corresponds to intra or intra-frame prediction (see step S51). If it is the I picture, all blocks are subjected to the intra prediction and thus no motion information is obtained. Therefore, an operation utilizing the activity (i.e., in the first to third embodiments (see FIGS. 5, 6, and 7)) is employed.

In contrast, if the current picture is not the I picture, since a P or B picture can be subjected to either of the intra and inter predictions, it is determined whether or not the encoding target block is a block to which the intra prediction is applied (see step S53).

Then the operation employing the activity is applied to the block for the intra prediction (see step S52) while the operation employing the motion state (shown in FIG. 11 or 12 of the fourth or fifth embodiment) is applied to the block for the inter prediction (see step S54).

Such a switching can improve the accuracy of the relevant determination.

As explained above, the amount of the orthogonal transformation can be reduced and degradation in the encoding efficiency can be prevented by determining the TU size (pattern) by utilizing (i) the information about whether or not the size for each prediction process (e.g., inter or intra) coincides with the CU size and (ii) single or a plurality of activity information items (e.g., activity values or difference in activity between adjacent blocks) or motion state items (e.g., above-described motion states or motion vectors) in the processing target CU.

In addition, an operation by combining any of the above methods (shown in the first to fifth embodiments) may be performed. For example, appropriate switching between the method of the first embodiment and the method of the second embodiment may be performed in a single LCU based on a certain condition. As another example, the method of the third embodiment is partially applied to the method of the second embodiment (e.g., so as to increase the number of elements to be determined).

Additionally, in a method which utilizes the motion state (as shown in the fourth embodiment), the block division may be performed in one step (as performed in the second embodiment) where a plurality of thresholds are used to determine a single TU size. Furthermore, in the operation of the fourth embodiment, (the size of) a motion vector may be utilized instead of the motion state so as to perform a threshold comparison process through a similar operation flow.

The image encoding apparatus in each embodiment described above may be implemented by utilizing a computer. In this case, a program for executing the relevant functions may be stored in a computer-readable storage medium, and the program stored in the storage medium may be loaded and executed on a computer system, so as to implement the relevant apparatus.

Here, the computer system has hardware resources which may include an OS and peripheral devices.

The above computer-readable storage medium is a storage device, for example, a portable medium such as a flexible disk, a magneto optical disk, a ROM, or a CD-ROM, or a memory device such as a hard disk built in a computer system. The computer-readable storage medium may also include a device for temporarily storing the program, for example, (i) a device for dynamically storing the program for a short time, such as a communication line used when transmitting the program via a network (e.g., the Internet) or a communication line (e.g., a telephone line), or (ii) a volatile memory in a computer system which functions as a server or client in such a transmission.

In addition, the program may execute a part of the above-explained functions. The program may also be a "differential" program so that the above-described functions can be executed by a combination of the differential program and an existing program which has already been stored in the relevant computer system. Furthermore, the program may be implemented by utilizing a hardware devise such as a PLD (programmable logic device) or an FPGA (field programmable gate array).

While the embodiments of the present invention have been described and shown above, it should be understood that these are exemplary embodiments of the invention and are not to be considered as limiting. Additions, omissions, substitutions, and other modifications can be made without departing from the technical concept and scope of the present invention.

INDUSTRIAL APPLICABILITY

The present invention can be utilized to speed up the encoding process by determining the size of the coding unit in image encoding, and in particular, to rapidly determine the size of TU (Transform Unit) in the HEVC.

REFERENCE SYMBOLS

1 CU size selection unit
2 prediction mode selection unit
3 RD cost computation unit
5 TU size determination unit
7 per-prediction mode optimum RD cost storage unit
8 in-CU prediction mode storage unit
9 CU pattern selection unit
10 video information extraction unit

The invention claimed is:

1. An image encoding apparatus that encodes an image so as to optimize estimated values of processing units which are a coding unit, a prediction unit, and a transform unit by selecting sizes of the individual processing units, the apparatus comprising:
   a division device that divides a coding unit included in the image into four divided blocks having a block size;
   an activity computation device that computes activities pertaining to the four divided blocks; and
   a transform unit size determination device that determines, based on the computed activities, a size pattern of the transform unit within the image having the size of the coding unit,
   wherein the transform unit size determination device
      determines whether any one of the four divided blocks has an adjacent block which produces an activity difference smaller than or equal to a predetermined threshold,
      when any one of the four divided blocks has the adjacent block, determines the block size of the four divided blocks as the size pattern of the transform unit, and
      when none of the four divided blocks has the adjacent block, determines a smaller block size as the size pattern of the transform unit, the small block size being obtained by dividing the block size of the four divided blocks.

2. An image encoding apparatus that encodes an image so as to optimize estimated values of processing units which are a coding unit, a prediction unit, and a transform unit by selecting sizes of the individual processing units, the apparatus comprising:
   a division device that divides an image having a size of the coding unit into a plurality of blocks;

a motion information computation device that computes motion information which indicates a motion state of each of the blocks by utilizing a numeric value:

a transform unit size determination device that determines, based on the computed motion information, a size pattern of the transform unit within the image having the size of the coding unit, wherein the motion information computation device computes, for each of the blocks, motion information items of any two blocks adjacent to the relevant block, where the two blocks each have a size smaller than or equal to the size of the relevant block; and if a difference between the two motion information items of the two blocks adjacent to the relevant block is smaller than or equal to a predetermined threshold, the transform unit size determination device determines the size of the transform unit in the relevant block to be a block size of the relevant block, otherwise the relevant block is further divided into small blocks, and the transform unit size determination device determines the size pattern of the transform unit by repeatedly subjecting, a predetermined number of times, each of the small blocks to the motion information acquisition of the adjacent blocks and the comparison between the difference of the relevant motion information items and the threshold.

3. An image encoding method that encodes an image so as to optimize estimated values of processing units which are a coding unit, a prediction unit, and a transform unit by selecting sizes of the individual processing units, the method comprising:

a division step that divides a coding unit included in the image into four divided blocks having a block size;

an activity computation step that computes activities pertaining to the four divided blocks; and a transform unit size determination step that determines, based on the computed activities, a size pattern of the transform unit within the image having the size of the coding unit, wherein the transform unit size determination step including:

determining whether any one of the four divided blocks has an adjacent block which produces an activity difference smaller than or equal to a predetermined threshold;

when any one of the four divided blocks has the adjacent block, determining the block size of the four divided blocks as the size pattern of the transform unit; and when none of the four divided blocks has the adjacent block, and determining a smaller block size as the size pattern of the transform unit, the smaller block size being obtained by dividing the block size of the four divided blocks.

4. A non-transitory computer-readable recoding medium having an image encoding program by which a computer executes the image encoding method in accordance with claim 3.

5. An image encoding method that encodes an image so as to optimize estimated values of processing units which are a coding unit, a prediction unit, and a transform unit by selecting sizes of the individual processing units, the method comprising:

a division step that divides an image having a size of the coding unit into a plurality of blocks;

a motion information computation step that computes motion information which indicates a motion state of each of the blocks by utilizing a numeric value:

a transform unit size determination step that determines, based on the computed motion information, a size pattern of the transform unit within the image having the size of the coding unit, wherein the motion information computation step computes, for each of the blocks, motion information items of any two blocks adjacent to the relevant block, where the two blocks each have a size smaller than or equal to the size of the relevant block; and if a difference between the two motion information items of the two blocks adjacent to the relevant block is smaller than or equal to a predetermined threshold, the transform unit size determination step determines the size of the transform unit in the relevant block to be a block size of the relevant block, otherwise the relevant block is further divided into small blocks, and the transform unit size determination step determines the size pattern of the transform unit by repeatedly subjecting, a predetermined number of times, each of the small blocks to the motion information acquisition of the adjacent blocks and the comparison between the difference of the relevant motion information items and the threshold.

6. A non-transitory computer-readable recoding medium having an image encoding program by which a computer executes the image encoding method in accordance with claim 5.

* * * * *